(12) United States Patent
Ray

(10) Patent No.: US 7,660,445 B2
(45) Date of Patent: Feb. 9, 2010

(54) METHOD FOR SELECTING AN EMPHASIS IMAGE FROM AN IMAGE COLLECTION BASED UPON CONTENT RECOGNITION

(75) Inventor: Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 110 days.

(21) Appl. No.: 12/104,779

(22) Filed: Apr. 17, 2008

(65) Prior Publication Data

US 2008/0212851 A1 Sep. 4, 2008

Related U.S. Application Data

(62) Division of application No. 10/717,157, filed on Nov. 19, 2003, now Pat. No. 7,382,903.

(51) Int. Cl.
*G06K 9/00* (2006.01)
(52) U.S. Cl. ..................................... 382/118
(58) Field of Classification Search ................ 382/115, 382/118, 173, 190, 209, 224; 348/231.2
See application file for complete search history.

(56) References Cited

U.S. PATENT DOCUMENTS

| 3,670,310 | A | | 6/1972 | Bharwani et el. | |
|---|---|---|---|---|---|
| 5,550,928 | A | * | 8/1996 | Lu et al. | 382/116 |
| 5,835,616 | A | | 11/1998 | Lobo et al. | 328/118 |
| RE36,041 | E | * | 1/1999 | Turk et al. | 382/118 |
| 5,995,978 | A | | 11/1999 | Cullen et al. | |
| 6,128,102 | A | | 10/2000 | Ota | |
| 6,253,201 | B1 | | 6/2001 | Abdel-Mottaleb et al. | |
| 6,393,150 | B1 | | 5/2002 | Lee et al. | 382/176 |
| 6,847,733 | B2 | * | 1/2005 | Savakis et al. | 382/225 |
| 7,035,467 | B2 | * | 4/2006 | Nicponski | 382/224 |
| 2002/0039447 | A1 | | 4/2002 | Shniberg et al. | |

(Continued)

FOREIGN PATENT DOCUMENTS

EP 1 109 132 A2 6/2001

(Continued)

OTHER PUBLICATIONS

"Automatic Text Location in Images and Vido Frames" by a.K. Jain in *Pattern Recognition*, vol. 31, No. 12, pp. 2055-2076.

(Continued)

*Primary Examiner*—Duy M Dang
(74) *Attorney, Agent, or Firm*—Justin Petruzzelli

(57) ABSTRACT

A method for selecting an emphasis image from a collection of images based on facial identification comprises the steps of: (a) obtaining a collection of digital images; (b) detecting image patterns indicative of the presence of one or more faces in the digital images, thereby identifying one or more detected faces for each image in which a face is detected; (c) recognizing one or more faces from the detected faces for each of the images in which a face is detected; and (d) scoring an image based on the relative frequency of occurrence of a recognized face within the collection of images, thereby producing an emphasis image characteristic of the most frequently occurring face in the collection of images.

10 Claims, 7 Drawing Sheets

U.S. PATENT DOCUMENTS

2002/0078043 A1 6/2002 Pass et al.
2003/0210808 A1* 11/2003 Chen et al. .................. 382/118

FOREIGN PATENT DOCUMENTS

EP  1 280 107 A2  1/2003

OTHER PUBLICATIONS

"Recognizing Characters in Scene Images" by J. Ohya et al. *IEEE Transactions on PAMI*, vol. 16, No. 2, pp. 214-220.

"Face Recognition Based on Fitting a 3D Morphable Model" by Volker Blanz and Thomas Vetter, *IEEE Transactions on Pattern Analysis and Machine Intelligence*, vol. 25, No. 9, Sep. 2003.

Rohini K Srihari: "Automatic Indexing and Content-Based Retrieval of Captioned Images" Computer, IEEE Computer Society, Long Beach, CA, US, US, vol. 28, No. 9, Sep. 1, 1995, pp. 49-56, XP000528008, ISSN: 0018-9162.

Zhongfei Zhang et al: "Face Detection and Its Applications in Intelligent and Focused Image Retrieval", Tools with Artifical Intelligence, 1999, Proceedings 11th IEEE International Conference on Chicago, IL, USA Nov. 9-11, 1999, Los Alamitos, CA, USA, IEEE Comput. Soc., US, Nov. 9, 1999, pp. 121-128, XP010365153, ISBN: 0-7695- 0456-6.

* cited by examiner

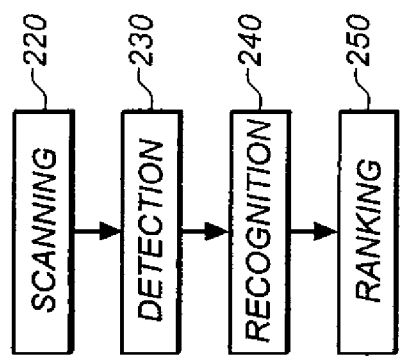
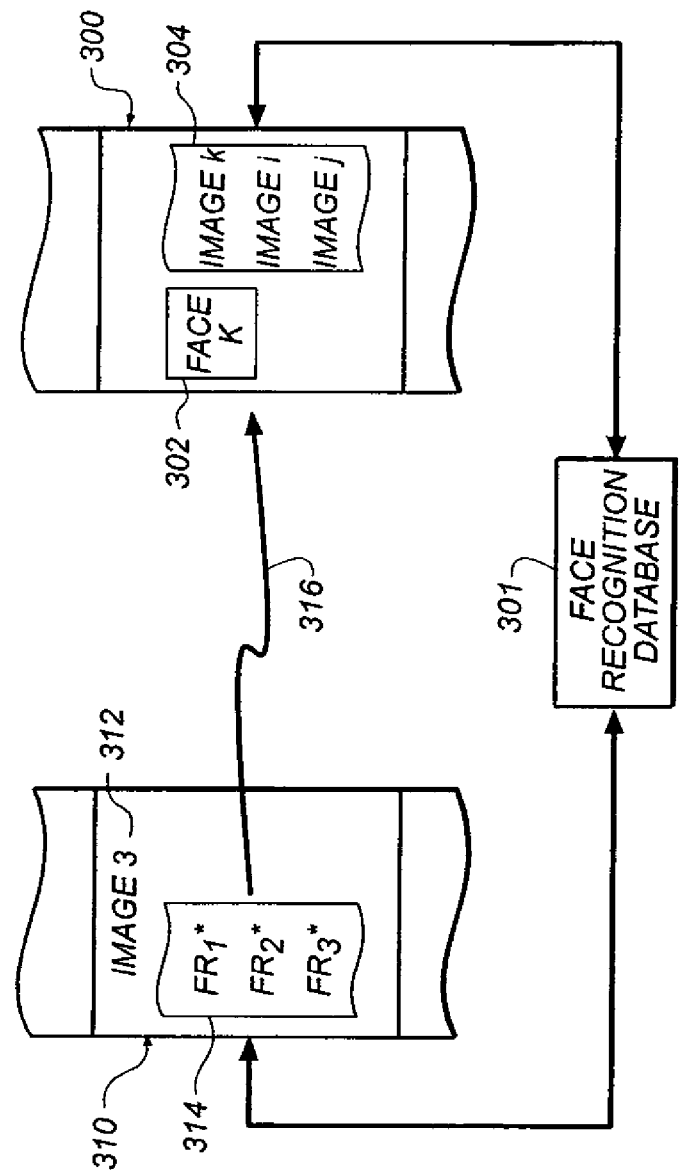

METHOD FOR SELECTING AN EMPHASIS IMAGE FROM AN IMAGE COLLECTION BASED UPON CONTENT RECOGNITION

CROSS REFERENCE TO RELATED APPLICATIONS

This is a divisional of U.S. application Ser. No. 10/717,157, filed Nov. 19, 2003, now U.S. Pat No. 7,382,903.

FIELD OF THE INVENTION

The invention relates generally to the field of digital image processing, and in particular to image understanding.

BACKGROUND OF THE INVENTION

Image assessment and understanding deal with problems that are easily solved by human beings given their intellectual faculties but are extremely difficult to solve by fully automated computer systems. Image understanding problems that are considered important in photographic applications include main subject detection, scene classification, sky and grass detection, people detection, automatic detection of orientation, etc. In a variety of applications that deal with a group of pictures, it is important to rank the images in terms of a logical order, so that they can be processed or treated according to their order. The basic notion of ranking is expressed in co-pending, commonly-assigned U.S. patent application Ser. No. 09/460,759, entitled "Method for automatic assessment of emphasis and appeal in consumer images," and which was filed 14 Dec. 1999 in the names of A. Savakis and S. Etz (which was also published as European Patent Application EP 1109132A2 on 20 Jun. 2001). According to this patent application, an image is automatically assessed with respect to certain features, wherein the assessment is a determination of the degree of importance, interest or attractiveness of the image. Feature quantities are processed with a reasoning algorithm, in particular a Bayesian network, that is trained on the opinions of one or more human observers and an output is obtained from the reasoning algorithm that assesses the image. A score is provided which, for a group of images, selects one image as the emphasis image.

A specific photographic application of interest is selecting one or more images from a collection of images that best represent the collection. This involves clustering the images into separate events and then selecting from images of each event the image that provides a viewer of the collection the best indication of the type of images in the collection. This is similar to selecting a cover image for an album, as the image provides the reader with a quick indicator of the images likely to be found in the album.

Another situation where the ranking of images in a collection is useful is when a fixed or limited amount of digital storage space is available and allocation of resources is important. Typically, digital imaging systems that store groups of images in a fixed storage space apply the same level of compression to all images in the group. This may be the situation for images stored in digital cameras, portable disks, etc. However, this approach does not take into consideration differences in emphasis or appeal between images. It is often desirable to maintain the visual quality of images that are appealing, while it is tolerable to degrade the visual quality of images that are not appealing. Therefore, it is desirable to obtain a digital system that first ranks images in terms of their relative value or appeal and then subsequently uses the results of this ranking to allocate the compression rates applied to each image. The goal is to allocate more storage to images with higher value. (See, e.g., co-pending, commonly assigned U.S. patent application Ser. No. 09/911,299, entitled "System and method for controlling image compression based on image emphasis" which was filed on 23 Jul. 2001 in the names of A. Savakis, M. Rabbani and S. Etz, and also published as European Patent Application EP 1280107A2 on 29 Jan. 2003.)

Using a small subset of the images in a collection to represent the collection is a common technique. A collection of images of a particular geographic region will likely have a cover image of a landmark that is generally identified with the location. For instance, an album of images of Paris will often have the Eiffel Tower contained in the cover image. A person looking at the cover will quickly surmise that the material in the collection is in some way linked to Paris or to France. This concept has been adopted for collections of digital images from consumer photographs, e.g., when automatically constructing an album or when selecting an image to put inside the "jewel-case" of a PictureCD®. Approaches to providing this have been to search an image collection to identify images that have photographic appeal. This approach is described in co-pending, commonly-assigned U.S. patent application Ser. No. 09/863,570, entitled "Retrieval and browsing of database images based on image emphasis and appeal," which was filed 21 May 2001 in the names of A. Savakis and R. Mehrotra.

Often photographs contain images of people of importance to the photographer. Events and places are typically recalled by identifying the people within a collection of images. Human appearance changes during the lifetime course of aging. However, we are extremely adept at estimating age and appearances of individuals as they age. More importantly, we are capable of identifying a person in an image, even though many years of aging may have occurred between the time when the picture was taken and when the image is viewed. Experience has shown that photographs taken by many amateur photographers have people in 75% of the images. In selecting an image to represent a collection, it would seem reasonable to select an image that contains people. Using this image, a viewer could quickly surmise the events, time and occasion the collection represents. The use of face detection also provides an automatic means to estimate the number of people present in an image. An image with a large number of people many times is typical of a group shot of the people of interest and such an image is consequently a candidate for the emphasis image.

The ability to detect faces and people within images is an aspect of computer vision that has become increasing sophisticated, and well known to those of ordinary skill in this art, to the point where over 90% of the faces within a typical image can be detected. Moreover, the ability to subsequently match faces to an individual, that is, face recognition, has also become more sophisticated to the point of being applied in many security and access control situations. There is an extensive research literature on means of accomplishing the task of face recognition, which is well known to those of ordinary skill in this art. Many of these references can be readily found in the literature or on the Internet, e.g., see Volker Blanz and Thomas Vetter, "Face Recognition Based on Fitting a 3D Morphable Model," *IEEE Transaction on PAMI*, Vol. 25, No. 9, September 2003. While face recognition normally is considered as a means of security or access control, the technology can be applied to situations where the identity of the person is not important. Rather, the presence of an individual within a series of images has value. The use of face recognition for this purpose has been applied to forming an indexing scheme for image libraries (see co-pending, commonly-assigned U.S. patent application Ser. No. 10/143,272, "Method and apparatus for organizing and retrieving images containing human faces", which was filed on 10 May 2002 in the names of L. Chen and M. Das). The use of current face recognition technology for these applications has an advantage relative to the access control applications, as the result gracefully degrades. Within an image collection, if there is one person that appears most frequently, then one of the images with that person present is a good candidate for selection as the emphasis image.

Another common approach used by many photographers is to include some images with signage, such as an image with a national park entrance sign identifying the name of the national park, and then to use one or more of the signage images to represent the collection. The signage is a "memory jogger" for the photographer to help recall the time and place where the images were captured. This is especially true of many vacation and holiday image collections. The purpose of these images is not for the photographic appeal, but rather as a pictorial annotation of the image collection. The annotation is provided by words on the signage, which generally provide a textual description related to subsequent images in the image collection.

The ability to locate and segment text in images has been used most often as a means to improve reproductions of images that are a combination of textual and pictorial content. An example of this is in rendering algorithms for desk-top printers, such as an inkjet printer attached to a personal computer. The methods used to reproduce superior text, when applied to pictorial content, usually result in inferior results. A similar result occurs when methods that produce superior pictorial reproductions usually result in inferior reproduction of text. Many algorithms have been proposed to overcome this problem, including commonly-assigned U.S. Pat. No. 6,393,150, entitled "Region-based image binarization system" and which issued 21 May 2002 to Lee, et. al. and "Automatic Text Location in Images and Video Frames," A. K. Jain, in *Pattern Recognition*, Vol. 31, No.12, pp. 2055-2076. Other methods follow the text segmentation with an optical character recognition algorithm in order to extract the textual content (see J. Ohya, et. al., "Recognizing Characters in Scene Images," *IEEE Transactions on PAMI*, Vol. 16, No. 2, pp. 214-220.

The ability for a computer to search a region and extract text in the region into an internal computer representation of the text, e.g., ASCII code, is well established and these techniques are included in many optical scanning systems. Once the text has been converted into a computer useable format, then it is possible to search for key words, which is a well-established technology.

In view of the interest in properly and concisely characterizing the content of a collection of images, what is needed is an automatic technique utilizing content recognition of, e.g., faces or signage in order to select an image that represents the main content of the collection of images and that can be used as the emphasis image for the collection.

SUMMARY OF THE INVENTION

The present invention is directed to overcoming one or more of the problems set forth above. Briefly summarized, according to one aspect of the present invention, the invention comprises a method for selecting an emphasis image from a collection of images based on facial identification, comprising the steps of: (a) obtaining a collection of digital images; (b) detecting image patterns indicative of the presence of one or more faces in the digital images, thereby identifying one or more detected faces for each image in which a face is detected; (c) recognizing one or more faces from the detected faces for each of the images in which a face is detected; and (d) scoring an image based on the relative frequency of occurrence of a recognized face within the collection of images, thereby producing an emphasis image characteristic of the most frequently occurring face in the collection of images.

According to another aspect of the present invention, the invention comprises a method for selecting an emphasis image from a collection of images based on the usage of text in the image, comprising the steps of: (a) obtaining a collection of digital images; (b) detecting text in the digital images; (c) generating statistics pertaining to the detected text, wherein said statistics represent a likelihood that the text describes the collection of images; and (d) scoring each image based on the statistics pertaining to the detected text, thereby producing an emphasis image containing text likely to represent the collection of images.

Compared to prior labor-intensive techniques for characterizing the content of a collection of images, the present invention has the advantage of being an automatic technique utilizing content recognition of, e.g., faces or signage in order to select an image that represents the main content of the collection of images and that can be used as the emphasis image for the collection.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 shows data structures used in the emphasis image selection process.

FIG. 4 shows a flow chart of the stages of the overall process according to the invention.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
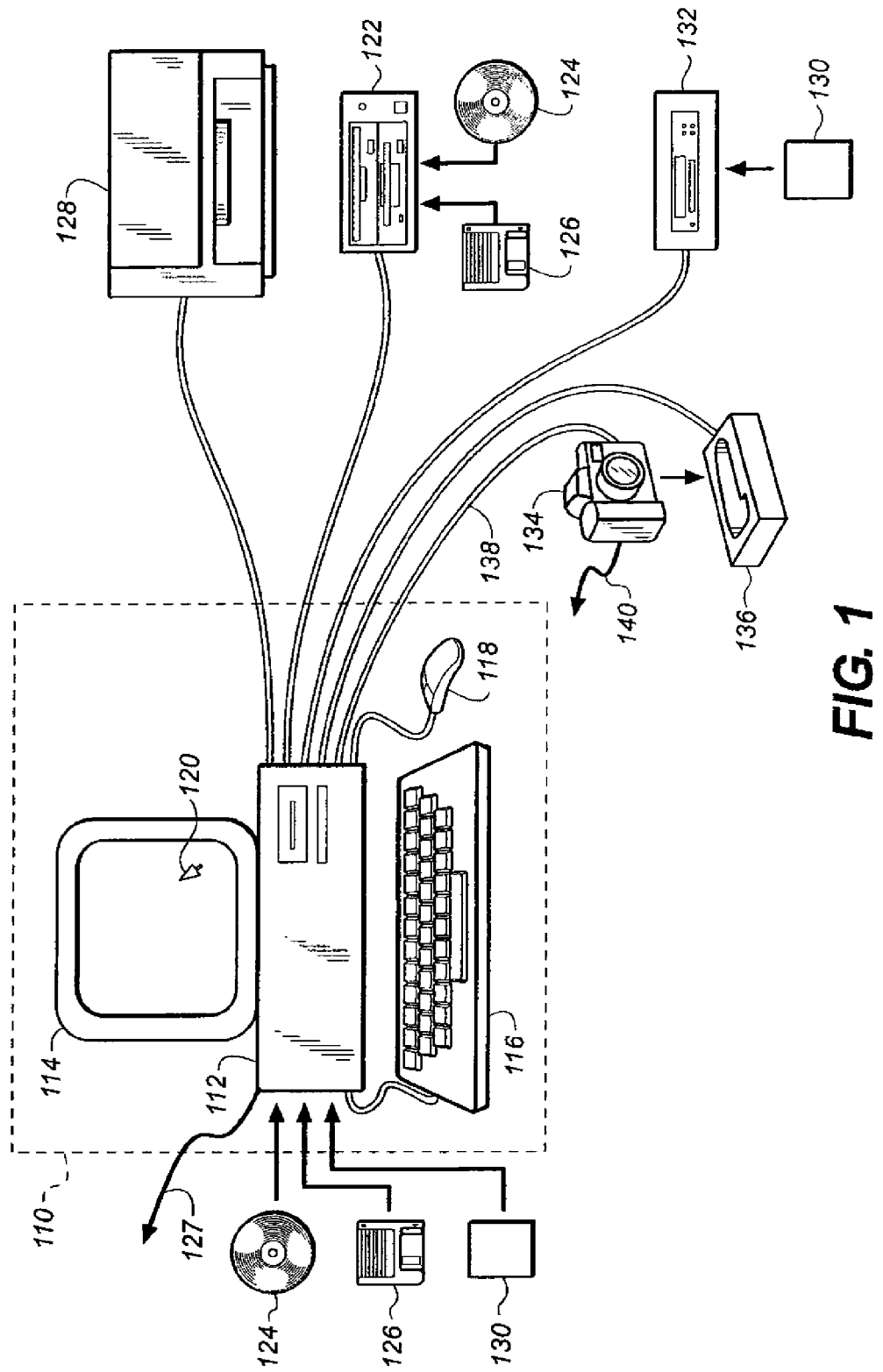
FIG. 1 is a perspective diagram of a computer system for implementing the present invention.

Before describing the present invention, it facilitates understanding to note that the present invention is preferably utilized on any well-known computer system, such as a personal computer. For instance, referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner (not shown). Images may be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm may be stored in any of the storage devices heretofore mentioned and applied to images within a collection. It is natural and convenient for the images of the collection to be indexed in some manner for referencing purposes. A common and convenient approach is to sequentially number the images within the collection as they are presented to the algorithm. Thus the first image presented has reference number 1, and the second image has reference number 2, etc. Other referencing schemes can be envisioned, but they all result in common behavior for the emphasis image selection process. The algorithm is utilized in order to search a collection of images for the purpose of identifying a limited subset of images from the collection. The intent of this subset is to provide the viewer of the image collection with a means to determine other images within the collection.

A collection of images, such as collected on a roll of film, often has some common theme and one of the images in the collection typifies the collection. This type of image is referred to as an emphasis image, as it emphasizes the content of the remaining images in the collection. The emphasis image can be used for many purposes, such as being a title picture in the case of a photo-album. A large percentage of images within many image collections have people as a significant part of the subject matter. A useful premise is that a good image to represent the collection is one that captures some aspect of the people in the image collection. The ability to detect and to count the occurrence of an individual within an image collection provides a quantitative means to effect this premise. According to another aspect of the invention, photographers often purposely compose one or more images that contain text in order for at least one picture to provide a hint at the source or event that has been photographed. The facial aspects of the invention will first be considered with respect to FIGS. 2-5, followed by consideration of the text aspect with respect to FIGS. 6-8.

Figure 2:
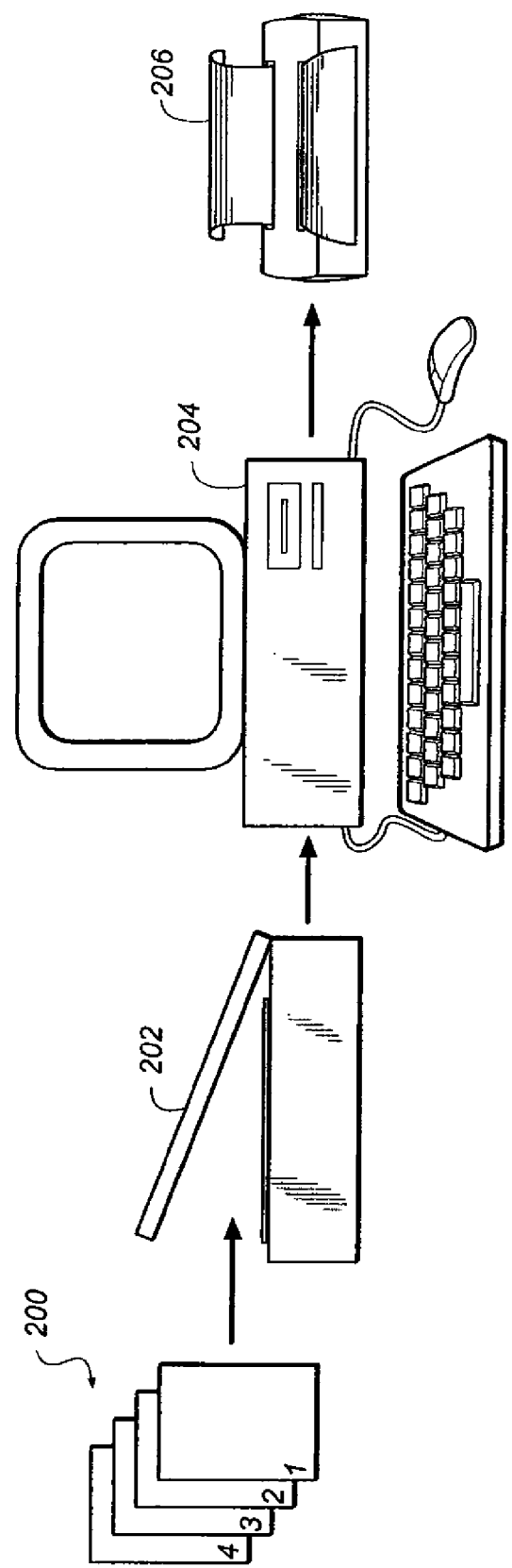
FIG. 2 is a diagram of the stages of the processing and selection of an emphasis image.

Referring to FIG. 2, the emphasis image selection process begins with an image collection 200 that is compiled as a collection of digital images. If the images are captured from a digital camera, then the initial collection and the digital collection are identical. In the case where the images are in hard copy or on a roll of film, they must undergo processing and scanning by a scanner 202 in order to arrive in a digital format. The collection of images, which are processed by a computer 204 and its accompanying software, are sorted according to the invention in terms of their suitability for being most representative of the collection. There are several uses for this sorted list of images. As an example, the top-ranked image can be printed out and used as a "cover-image" 206 for the collection. This image may be used as a visual means for sorting through a collection of image collections.

Referring to FIG. 3, two data structures are established for the collection. The first data structure 300 supports a database 301 and a face recognition capability within the processing system 204 that operates on the image collection. As each image is processed, a number of faces are detected. An individual face is extracted from the image, and compared against all the other faces that have been previously detected. If the face is not recognized as having been previously seen within the collection, then a corresponding face record 302 is added to the collection of previously seen faces in the first data structure 300. The collection of previously seen faces includes the reference numbers 304 of all images within the collection where that particular face has appeared. The database is modified until all images within the collection are processed. The second data structure 310 is a list, with an entry 312 in the list being a structure comprising a number of faces detected in a given image (in this example image 3), and a list of pointers 314. The pointers 314 are addresses, as represented by the addressing arrow 316, into the recognition database 301 supported by the first data structure 300, to the location where information about the detected face is located. Thus, the $n^{th}$ entry 312( . . . $n$) in the list 310 is the number of detected faces in the $n^{th}$ image and the same number of pointers 314( . . . $n$) into the face recognition database. It is clear that the two structures 300 and 310 are closely linked with cross-references. Both of these two data structures are used to determine the selection of the emphasis image.

Referring to FIG. 4, the processing of the image collection follows a rather simple path exemplified by the processing stages of scanning 220, detection 230, recognition 240 and ranking 250. Referring to FIG. 4 in conjunction with FIG. 2, the image collection 200 is converted in the scanning stage 220 by the scanner 202 into a set of digital images. Of course, if the images were captured digitally, then this step is unnecessary. Each digitized image is processed in the detection stage 230 to identify whether the image contains patterns that are detected as being a human face. There are a number of known algorithms that can be used for this purpose. A preferred algorithm is one with satisfactory performance with cluttered backgrounds and with a large range of facial orientations within the image. Many face detection algorithms work well, provided the faces have a face orientation that is close to zero in each of the pose angle, in-plane orientation and gaze angle directions, as these angles and orientations are understood by those of ordinary skill in this art. As the facial images deviate from this conformation, the detection rates may drop precipitously. While all current algorithms exhibit this behavior, it is preferable to use an algorithm that shows minimal degradation, e.g., see Neils da Vitoria Lobo and Young Ho Kwon, "Face Detection Using Templates", U.S. Pat. No. 5,835,616, issued Nov. 19, 1998, which is incorporated herein by reference. More specifically, once the $n^{th}$ image is converted into a digital format, the face detection algorithm is applied in the detection stage 230 and the second data structure 310 of face occurrences is updated with the number of found faces. If no faces are found, then no additional processing for this image is required. If a face is found, then—using a face recognition algorithm—the face is compared in the recognition stage 240 to the database supported by the first data structure 300 of previously seen faces. If the face has been previously seen, then the list 304 of images containing this face has the reference number to the face appended. If the face has not been previously seen, then a new face record 302 is appended to the first data structure 300, and the reference number 304 to the current image is appended to the list 304 of images where the face was contained.

Figure 5:
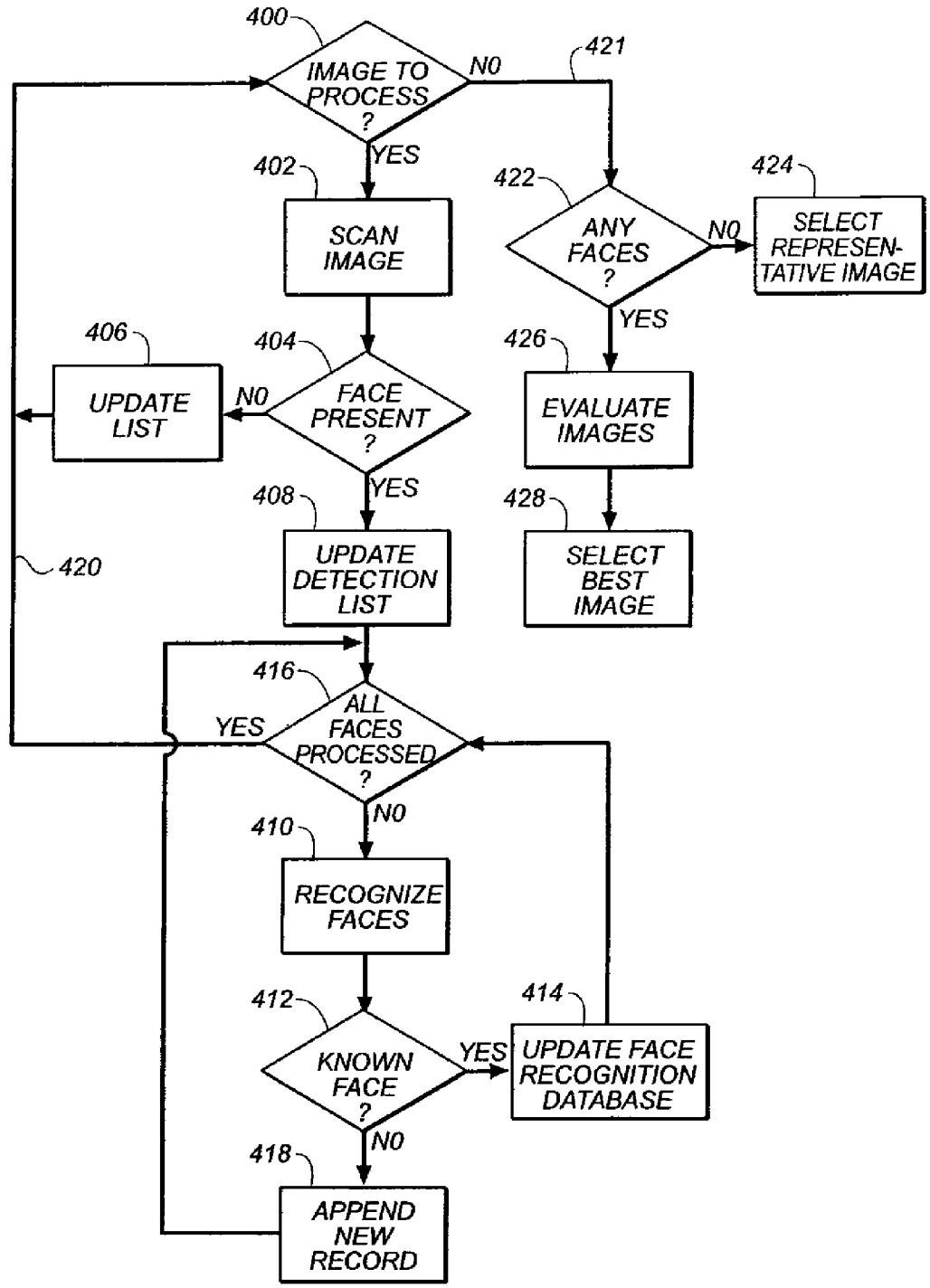
FIG. 5 shows a flowchart of the emphasis image selection algorithm based on facial content.

Referring to FIG. 5, the data structures containing information on the number of detected faces and the occurrences of individual faces within the image collection are utilized. The algorithm for the emphasis image combines the data of these two lists. Assuming the images in the collection are sequentially indexed, let $\phi(i)$={number of faces detected in image $i$} and $\tau(i)$={number of occurrences within the image collection of the faces within Image $i$}

The preferred rating of ith image, $\rho(i)$, as the emphasis image is:

$$\omega_1\phi(i)+\omega_2(\tau(i)-\phi(i))$$

The two parameters $\omega_1$ and $\omega_2$ are weights of proportionality. The preferred weights of these two are unity, giving the number of faces and the occurrence of faces equal weight in the evaluation. It is obvious, but worth noting, that $\rho(i)$ is zero if no face is detected in an image. Also, if $\omega_2=0$, then the preferred rating is determined strictly upon the number of faces in an image and not the number of occurrences within the image collection.

For each image in the collection a vector of attributes is established, say $\alpha=(\alpha_1, \alpha_2, \ldots, \alpha_n)$. The individual attributes within the vector in some instances will be determined independently of the images in the collection, while others will depend upon properties of the collection as a whole. An example of the latter type is determining the relative frequency of an individual within the images of the collection. In this case, since the number of individuals within any particular image is variable, the attribute can be restricted to the most frequent occurrence of an individual or some limited number of individuals within an image. The preferred embodiment uses the largest relative frequency of two individuals. Other attributes will be the number of faces found in the image, the number of special objects detected and aspects of text found within the image. The algorithm for the emphasis image combines the data from the attribute vectors of each image. Assuming the images within the collection are sequentially indexed, it is convenient to index the attribute vectors to reflect the indexing, so let $\beta_i$ be the $i^{th}$ attribute vector. In order to determine the emphasis image, the attribute vectors are evaluated using a metric. A simple, yet effective metric is to establish a vector of importance factors, where the length of this vector is the same as the length of the attribute vector. The evaluation is simply the dot product of the importance factors and the attribute vector, that produces a single number or score, $\rho(i)$, for an individual image. The emphasis image is the image that receives the highest score. It is quite possible that several images might all receive the best score. In these instances, the image selected as the emphasis image will be the image with the lowest index value. Other approaches are equally valid; however, a means to resolve this situation is required.

The performance of current face recognition algorithms is far from perfect, and the face recognition algorithm may have difficulty in matching people if some changes to the appearance have occurred. An example is that a person without sunglasses in one image is unlikely to be identified with an image of the same person wearing sunglasses. The selection algorithm is tolerant of these limitations, but situations can be envisioned where an image is not selected to be the emphasis image because of limitations of face recognition.

Referring to FIG. 5, the high-level organization of the algorithm is presented. The first step 400 is to determine if any of the images in the collection remain to be processed. It is assumed that there will be at least one such image, and it is assumed in general that a plurality of images will be processed. For a moment, assume that an image in the collection remains to be processed. If the image is in hardcopy format, or is in the form of a photographic negative, the image must be scanned in step 402 to convert the image into a digital format. If the images come from a digital camera, then this step can be omitted. The next step 404 is to detect whether a face is present in the image. There are a number of algorithms published describing this process. If no face is detected, then the image requires no further processing, and the list is updated in a step 406 and a zero is placed in the image indexed list of faces detected. The process then moves to the next image to be processed. If a face is detected in the step 404, then the detection list is updated in step 408 and the face recognition subsystem 410 is activated. The current face is compared to the previously seen faces in step 412 and if a match is found, then the list referencing images with this face is updated in step 414. Otherwise, a new face is appended as a new record in the step 418. This is continued via step 416 until every face in the image is processed in this manner by the face recognition subsystem. Once this is complete, the algorithm returns via path 420 to process subsequent images. If there are no additional images that remain in the collection to be processed, the algorithm proceeds via path 421 to select the preferred image to represent the collection. If no faces have been detected in any image as determined by step 422, then the algorithm defers to other means 424 of selecting a representative image, or simply picks one at random. If faces have been detected in one or more images as determined by step 420, the images are evaluated in step 426 according to the preferred rating algorithm and the emphasis image is then selected in step 428 by using the list of faces detected and the database developed by the face recognition subsystem in the manner previously described. If the maximum rating is shared among a plurality of images, then either one image of that limited set is selected at random, or the first image with respect to the indexing of the image collection, with the maximum property is selected as the emphasis image.

According to another aspect of the invention, photographers often purposely compose one or more images that contain text in order for at least one picture to provide a hint at the source or event that has been photographed. Accordingly, the present invention further assumes that images with text are preferable images for selecting as an emphasis image. An algorithm is used that first selects images from the collection with regions containing text and then uses measures, such as proportion of the image containing detected text, to select one image with text as the emphasis image.

Referring back to FIG. 2, each digitized image is processed by the computer 204 and its associated software to identify whether the image has regions that are identified as possessing textual data. Since not all images have this property, only those having this property are selected for additional processing. Images with textual content are then processed to determine statistics about the region containing text, including, but not limited to relative textual area and size of text. Optionally, an optical character recognition algorithm (OCR) is applied to convert the characters into data useable for a computer, i.e., ACSII codes. The statistical data and the character data are then used to ascertain a preferred image. Typically, this image will contain a sizable amount of text, where the characters are sufficiently large to be read in an image under normal viewing conditions, and optionally, a reasonable count of key words is found in the text.

Figure 6:
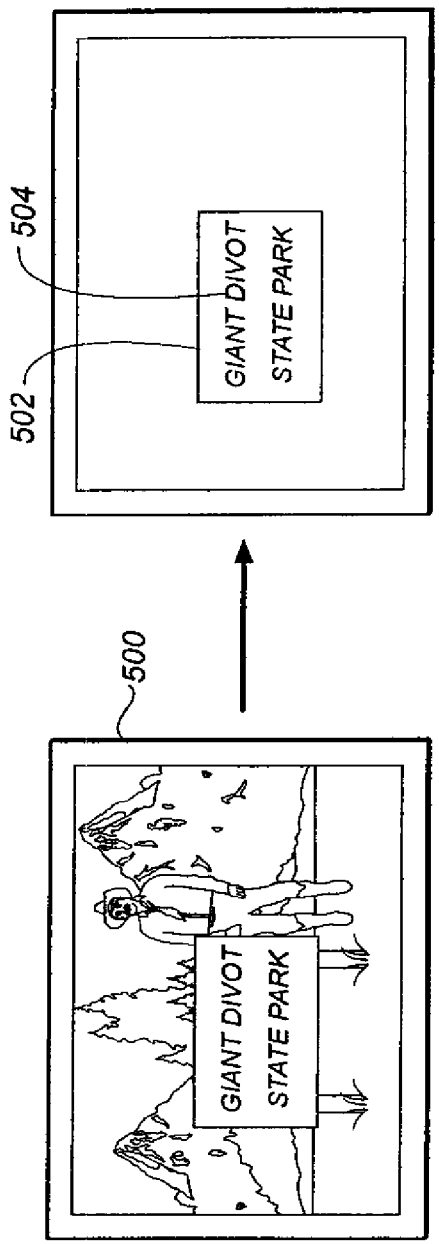
FIG. 6 is a pictorial illustration showing the extraction of text from a photograph.

Referring to FIG. 6, an image 500 is processed to determine a region 502 that carries textual information. There are a number of known algorithms that are capable of performing this task with some degree of success. It is also recognized that these algorithms do not always find text and they also may return regions that do not carry textual information. However, from the regions selected it is a simple task to determine the proportion of the image that is identified as carrying textual information. The relative size of the characters 504 within the text region can also be estimated. Large text is preferred over smaller text, as it is more likely that an image with large text was intentionally composed in order to capture the textual information. In either case, larger is preferred.

Figure 7:
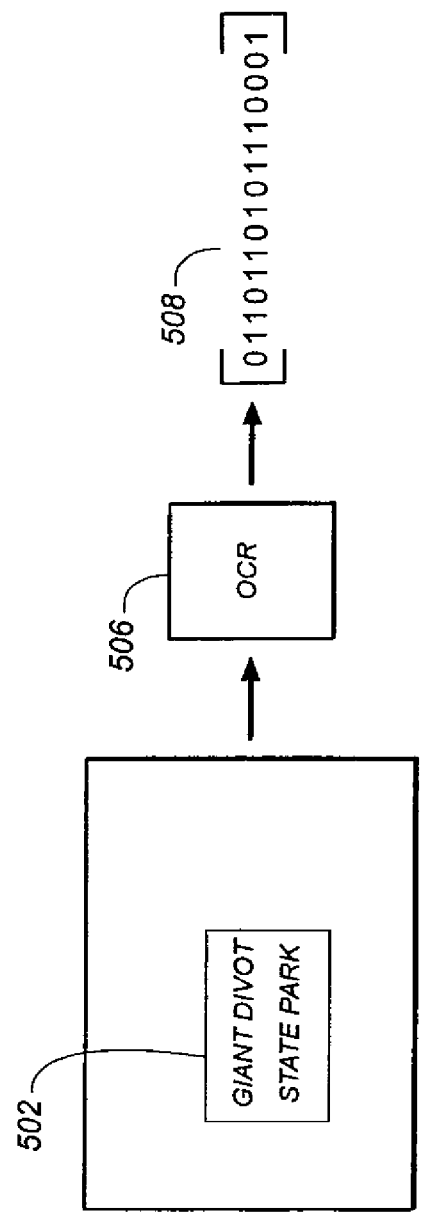
FIG. 7 is a pictorial illustration showing the generation of measures used to select the emphasis image.

Referring to FIG. 7, once a text region 502 is identified, the optical characters can be interpreted by an algorithm 506, such as a OCR algorithm. The characters 504 can then converted into computer codes 508, such as ASCII. The ASCII text strings can then be searched for the presence of key words, such as Park, City and Birthday. The key words are typically those that pertain to place, event or time. The larger the number of such key words the more preferred the image. Consequently, a description of the data retrieved from each image may include, without limitation:

the area containing text
maximum text size
word count
keyword count
converted text Such data will be extracted from each image in the collection. There are at least two options to store the extracted data. One option is to store the data within the so-called header of the image, and then the data is attached to the file containing the image. Another option is to store the data in a separate database maintained within the overall system for the image collection of interest. The choice is one of implementation preference, and the choice is not critical to the performance of this invention. In the following description, the data will be referred to as metadata. Contained within the metadata is the area of the text region, the maximum text size, a word count, a keyword count and the text converted from the image into ASCII format.

Figure 8:
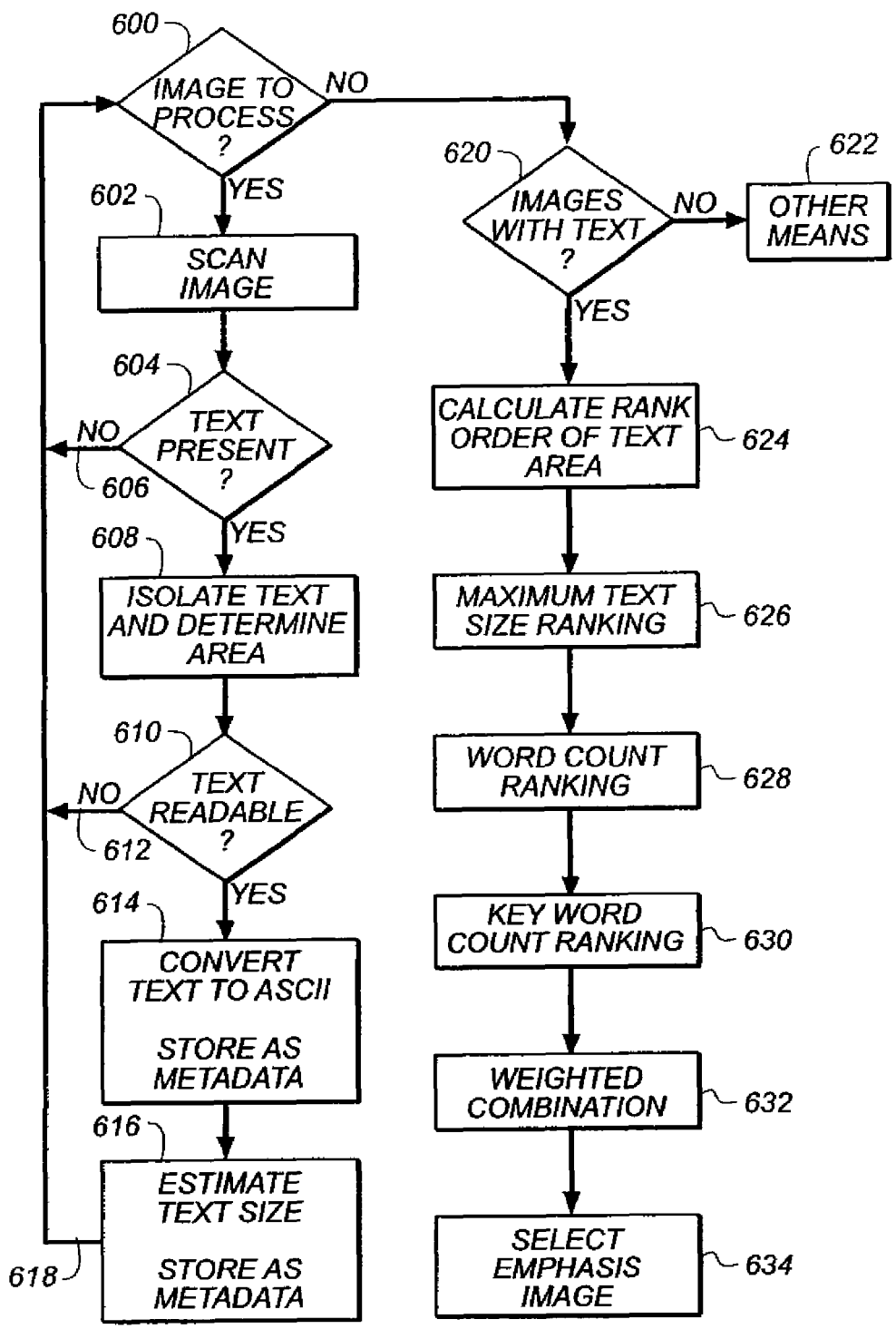
FIG. 8 shows a flowchart of the emphasis image selection algorithm based on textual content.

Referring to FIG. 8, a high-level organization of the text-based algorithm is presented. The first step 600 is to determine if any of the images in the collection remain to be processed. It is assumed that there will be at least one such image, and it is assumed in general that a plurality of images will be processed. For a moment, assume that an image in the collection remains to be processed. If the image is in hardcopy format, or is in the form of a photographic negative, the image must be scanned in step 602 to convert the image into a digital format. If the images come from a digital camera, then this step can be omitted. The next step 604 is to detect whether text is present in the image. There are a number of algorithms published describing this process. If no region is detected that contains text, then the image requires no further processing, and a zero is placed in the area field of the header with the remaining information left blank. The process then returns via path 606 to step 600 to determine the next image in the collection to be processed. If a region containing text is detected, the regions containing text are isolated in step 608 and the area comprising the region is determined. The size of the text is then analyzed in step 610 to determine if the text is readable from a normal viewing distance. If not, the process returns via path 612 to step 600 to determine the next image in the collection to be processed. If the text is readable, the text is converted to ASCII and stored as metadata in step 614. Next, the text size is estimated in step 616 and the result is stored as metadata. At this point, the parameters comprising the text area, the converted text and the estimated text size will be stored as metadata. Once this is complete for the current image, the algorithm returns via path 618 to process subsequent images in step 600. If there are no additional images to process in the collection, the algorithm proceeds to select the preferred image to represent the collection. The headers for each image are searched in step 620 and those images having positive areas with text are considered in steps 624-632. If no such image is found, then the algorithm defers to step 622 for other means of selecting a representative image, or simply picks one at random. There are four numerical values in the header, and for each image with text, a rank order of each text area is calculated in step 624, a rank order based on a maximum text size determination is performed in step 626, and a rank order based on a word count is performed in step 628 and a rank order based on key word count is are performed in step 630. The four rank orders are then combined into a weighed combination in step 632 and the image with the lowest overall score is selected as the emphasis image in step 634.

Figure 9:
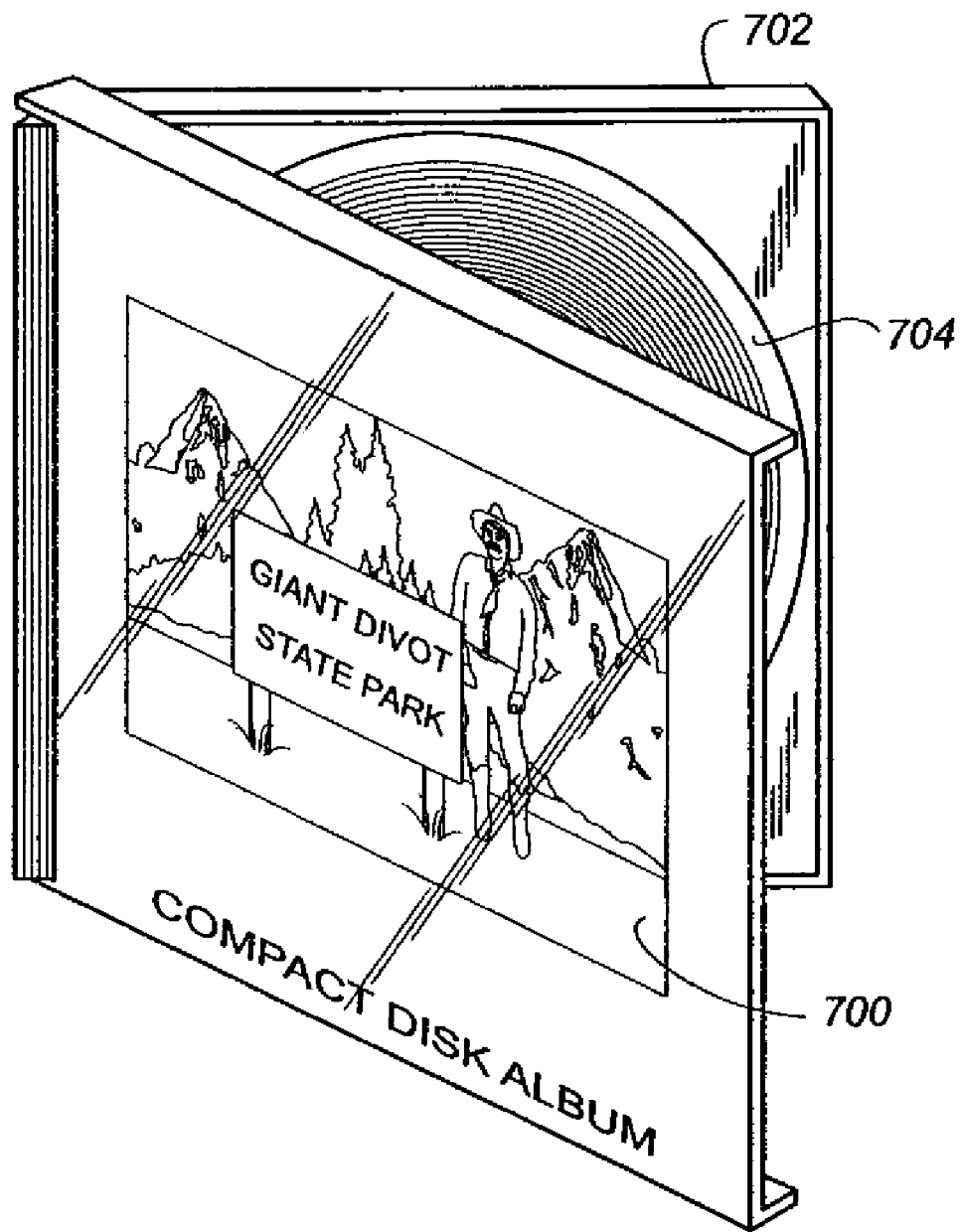
FIG. 9 shows an example of how an emphasis image may be used.

The emphasis image may be used in a wide variety of ways that would be apparent to one of ordinary skill in this art, including without limitation use as a cover image for an album or for a collection of images on a CD. For instance, referring to FIG. 9, the selected emphasis image is printed as the cover 70-0, e.g., to an album or jewel case 702, and/or placed as the first picture in the collection on the CD 704. This gives the collection owner a quick visual reference to the images contained in the collection.

The invention has been described in detail with particular reference to certain preferred embodiments thereof, but it will be understood that variations and modifications can be effected within the spirit and scope of the invention.

PARTS LIST 110 computer system
112 microprocessor-based unit
114 display
116 keyboard
118 mouse
120 selector on display
122 disk drive unit
124 compact disk-read only memory (CD-ROM)
126 floppy disk
127 network connection
128 printer
130 personal computer card (PC card)
132 PC card Reader
134 digital camera
136 camera docking port
138 cable connection
140 wireless connection
200 image collection
202 scanner
204 computer and software
206 emphasis image
220 scanning stage
230 detection stage
240 recognition stage
250 ranking stage
300 first data structure
301 recognition database
302 face record
304 reference numbers
310 second data structure
312 entry
314 list of pointers
316 addressing arrow
400 process determination step
402 scanning step
404 face detection step
406 list update step
408 detection list update step
410 face recognition step
412 face comparison step
414 update recognition step
416 face determination step
418 new record step
420 path
421 path
422 face determination step
424 other selection means step
426 image evaluation step
428 emphasis image selection step
500 image
502 region
504 characters
506 OCR algorithm
508 computer codes
600 process determination step
602 scanning step
604 text detection step
606 path
608 isolate text step
620 text readability determination step
612 path
614 convert text to ASCII step
616 text size estimation step
618 path
620 header search
622 other selection means step
624 text area ranking step
626 text size ranking step
628 word count ranking step
630 key word count ranking step
632 weighting step
634 emphasis image selection step
700 cover image
702 jewel case
704 CD

What is claimed is:

1. A method for selecting an emphasis image from a collection of images based on facial identification, said method comprising the steps of:
   (a) obtaining a collection of digital images;
   (b) detecting image patterns indicative of the presence of one or more faces in the digital images, thereby identifying one or more detected faces for each image in which a face is detected;
   (c) recognizing one or more faces from the detected faces for each of the images in which a face is detected
   (d) scoring an image based on the relative frequency of occurrence of a recognized face within the collection of images, thereby producing an emphasis image characteristic of the most frequently occurring face in the collection of images;
   (e) detecting text in the digital images;
   (f) generating statistics pertaining to the detected text, wherein said statistics represent a likelihood that the text describes the collection of images; and
   (g) scoring the image based on the statistics pertaining to the detected text and the relative frequency of occurrence of a recognized face within the collection of images, thereby producing an emphasis image.

2. The method as claimed in claim 1 wherein the statistics pertaining to the detected text include at least one of an area containing the detected text, a maximum size of the detected text, a count of the words expressed by the detected text, and a count of the keywords expressed by the detected text.

3. A method for selecting an emphasis image from a collection of images based on the usage of text in the image, said method comprising the steps of:
   (a) obtaining a collection of digital images;
   (b) detecting text in the digital images;
   (c) generating statistics pertaining to the detected text, wherein said statistics represent a likelihood that the text describes the collection of images; and
   (d) scoring each image based on the statistics pertaining to the detected text, thereby producing an emphasis image containing text likely to represent the collection of images.

4. The method as claimed in claim 3 wherein the statistics pertaining to the detected text include at least one of an area containing the detected text, a maximum size of the detected text, a count of the words expressed by the detected text, and a count of the keywords expressed by the detected text.

5. The method as claimed in claim 3 further comprising the steps of:
   (e) detecting image patterns indicative of the presence of one or more faces in the digital images, thereby identifying one or more detected faces for each image in which a face is detected;
   (f) recognizing one or more faces from the detected faces for each of the images in which a face is detected; and
   (g) scoring an image based on the relative frequency of occurrence of a recognized face within the collection of images as well as the statistics pertaining to the detected text thereby further producing an emphasis image characteristic of the most frequently occurring face in the collection of images.

6. The method as claimed in claim 3 wherein the collection of digital images are obtained from a digital camera.

7. The method as claimed in claim 3 wherein the collection of digital images are obtained from scanned film images.

8. The method as claimed in claim 3 wherein the emphasis image is used in the formation of a photo-album.

9. The method as claimed in claim 8 wherein the emphasis image is used as a cover image for the photo-album.

10. The method as claimed in claim 3 wherein the emphasis image is used as a cover image for a jewel case of a CD.

* * * * *